United States Patent [19]

Bhasin

[11] 4,038,175
[45] July 26, 1977

[54] SUPPORTED METAL CATALYST, METHODS OF MAKING SAME, AND PROCESSING USING SAME

[75] Inventor: Madan Mohan Bhasin, Charleston, W. Va.

[73] Assignee: Union Carbide Corporation, New York, N.Y.

[21] Appl. No.: 645,715

[22] Filed: Dec. 31, 1975

Related U.S. Application Data

[63] Continuation-in-part of Ser. No. 508,721, Sept. 23, 1974, abandoned, Ser. No. 508,709, Sept. 23, 1974, abandoned, and Ser. No. 488,497, July 15, 1974, abandoned.

[51] Int. Cl.$^2$ ............................................. C10G 23/04
[52] U.S. Cl. .................................... 208/144; 208/255; 252/466 PT
[58] Field of Search ............... 208/255, 143, 144, 145; 260/683.9

[56] References Cited

U.S. PATENT DOCUMENTS

| | | | |
|---|---|---|---|
| 3,075,917 | 1/1963 | Kronig et al. ...................... | 208/255 |
| 3,182,015 | 5/1965 | Kronig et al. ...................... | 208/255 |
| 3,221,078 | 11/1965 | Keith et al. ......................... | 208/144 |
| 3,770,619 | 11/1973 | Derrien et al. ..................... | 208/255 |
| 3,787,514 | 1/1974 | Bernusset ........................... | 260/683.9 |
| 3,788,979 | 1/1974 | Caflisch et al. ..................... | 208/255 |

*Primary Examiner*—George Crasanakis
*Attorney, Agent, or Firm*—Marilyn Klosty

[57] ABSTRACT

There is described a catalyst composition suitable in the hydrogenation of, for example, dripolenes, which consists essentially of palladium, or platinum metal dispersed on e.g., an alpha-alumina support, said support possessing the following characteristics:

a. a porosity of about 0.1 cubic centimeter to about 0.8 cubic centimeter per gram of support;

b. a surface area of about 0.1 square meter to about 10 square meters per gram of support; and c. an average pore size of about 0.05 micron to about 100 microns, a major proportion of the pores having a pore size in the range of about 0.05 micron to about 10 microns, wherein the amount of palladium dispersed on the surface of the support is about 0.01 per cent to about 1.0 per cent by weight of metal based on the weight of the catalyst composition, and the amount of platinum dispersed on the surface of the support is about 0.02 per cent to about 2.0 per cent by weight of metal based on the weight of the catalyst composition; and wherein at least about 7.5 per cent of the total metal atoms dispersed on the surface of the support are exposed. One process described for the making of such a catalyst utilizes either a palladium or platinum nitrate solution from which the catalyst is deposited upon an alpha-alumina support. Another process for making the catalyst involves impregnating the alpha-alumina support with a solution of palladium or platinum acetylacetonate followed by appropriate drying.

11 Claims, No Drawings

SUPPORTED METAL CATALYST, METHODS OF MAKING SAME, AND PROCESSING USING SAME

This application is a continuation-in-part of copending U.S. application Ser. Nos. 488,497, filed on July 15, 1974, Ser. No. 508,709, filed on Sept. 23, 1974; and Ser. No. 508,721 filed on Sept. 23, 1974, each of which is now abandoned.

This invention relates to a palladium or platinum supported catalyst dispersed on a low surface area support. Most particularly, this invention is concerned with the utilization of such catalysts in hydrogenation, dehydrogenation, and oxidation process, most specifically, the invention is directed to the hydrogenation of dripolenes, such as is described in U.S. Pat. No. 3,751,361, the disclosure of which is incorporated herein by reference for the purposes of defining dripolenes and for defining procedure and apparatus by which such dripolenes are hydrogenated.

Heterogeneous catalysis is well known, for example, in selective hydrogenation, dehydrogenation, and various oxidation processes, and low surface area supported catalysts, specifically transition metals on inert supports, have been provided over the years for these and other processes utilizing heterogeneous catalysts.

One of the most important characteristics of a catalyst used in heterogeneous catalysis is the number of active catalyst sites available to the reactants since this characteristic directly influences the reaction rate. The number of active sites can be translated into the number of atoms of metal exposed on the surface of the support. This number of exposed surface atoms is especially important with regard to low surface area supported catalysts because there is a greater tendencey during the preparation of such catalysts for the atoms to stack up or agglomerate on the surface rather than spread out that would be the case in supports having a high surface area. The number of exposed surface atoms can be expressed as a percentage of the total metal atoms dispersed on the surface of the support. The ideal, of course, is 100 percent. In practice, the highest percentage that has been attained on low surface area supports is about five percent, however.

Up until this time, the art has apparently foregone attempts to achieve a high active-site single metal catalyst on low surface area supports and has turned to optimizing the high surface area supported catalysts. One avenue used to minimize certain adverse characteristics of the high surface area support is the use of several metals in combination as a catalyst, but these multicomponent catalysts are expensive to produce. Other disadvantages of the high surface area supports which have not been overcome are that the innermost surfaces of such supports are inaccessible to many reactants and the tendency to cause coking of the reactants or products, which results in shorter catalyst life and the need for frequent regeneration.

These problems are not inherent in the low surface area supports and tend to make them desirable; however, the low number of active sites on available low surface area catalysts has pushed them into the background insofar as the catalysts of choice for most commercial operations are concerned.

An object of this invention, therefore, is to provide a supported metal catalyst having at least about 7.5 percent of the metal atoms exposed on the surface of the support, said percentage based on the total number of metal atoms dispersed on the surface of the support, thus achieving for the first time a truly high active site single metal low surface area catalyst.

Other objects and advantages will become apparent hereinafter.

According to the present invention, a catalyst composition has been discovered consisting essentially of palladium or platinum metal dispersed on the surface of an alpha-alumina support, said support having the following characteristics:

a. a porosity of about 0.1 cubic centimeter to about 0.8 cubic centimeter per gram of support;

b. a surface area of about 0.1 square meter to about 10 square meters per gram of support; and c. an average pore size of about 0.05 micron to about 100 microns, a major proportion of the pores having a pore size in the range of about 0.05 micron to about 10 microns.

wherein the amount of palladium dispersed on the surface of the support is about 0.01 percent to about 1.0 percent by weight of metal based on the weight of the catalyst composition, and the amount of platinum dispersed on the surface of the support is about 0.02 percent to about 2.0 percent by weight of metal based on the weight of the catalyst composition; and wherein at least about 7.5 percent of the total metal atoms dispersed on the surface of the support are exposed.

The catalyst compositions provided here find wide applicability in the hydrogenation, dehydrogenation, hydrogenolysis, hydrocracking, cracking, and/or isomerization of olefins, paraffins, and naphthenes, and in aromatization, reforming, or oxidation. Such compositions should be especially useful in reactions where there are diffusion limitations. Most particularly, these catalysts find the most beneficial use in the hydrogenation of dripolenes.

Dripolene is a liquid by-product of a hydrocarbon cracking process for the production of ethylene. For many years the $C_5$ to $C_8$ fraction of dripolene has been distilled off and used as a blending component in the gasoline market, but the $C_9 +$ fraction, which makes up about 10 percent to about 20 percent by weight of the dripolene has proved to be of comparatively little commercial value in view of its high gum content after distillation, 1000 to 5000 milligrams per 100 milliliters, and poor stability, both of which cause malfunction in gasoline engines.

What is known as the $C_9 +$ fraction (or $C_9 +$ dripolene) has potential as gasoline blending because of its make-up, which varies over wide range, but generally comprises styrenes; indenes; naphthalenes; alkylbenzenes having one or more alkyl side chains each having one to six carbon atoms; a small amount, if any of cyclopentadiene and its methyl derivatives; dicylopentadiene and its methyl derivatives; and, on occasion, some $C_7$ compounds. In terms of boiling points, the components have ranged upwards from as low as about 30° C.

A chromatographic analyses of several specific $C_9 +$ fractions shows the following compounds to be present in all or some of the fractions: ethynylbenzene, ethylbenzene, m-xylene, o-xylene, p-xylene, styrene, m- and p-ethyltoluene, o-ethyltoluene, mesitylene, psuedocumene, o-methylstyrene, m- and p-methylstyrene, beta-methylstyrene, indan, indene, $C_4$ benzenes, Tetralin, naphthalene, methylindenes, methylnaphthalenes, n-octane, n-nonane, n-decane, cyclopentadiene, methylcyclopentadiene, bicyclonoadiene, isopropenylbicycloheptene, dicylopentadiene, methyldicyclopentadiene, vinylbicycloheptene, dimethyldidcyclopentadiene, and allylbenzene.

In spite of the high octane blending potential of the $C_9+$ fraction, its disadvantages, i.e., high gum content and polymer formation on distillation, the attendant fouling of processing apparatus, poor stability, low overall octane values, persistent foul odors, low volatilities, and propensity for shortening of catalyst life when hydrogenated, have been difficult, if not impossible to overcome, using known methods for dealing with same. For example, one method proposed to reduce gum formation in the $C_9+$ fraction was hydrotreatment which is a process for reacting hydrogen with some of the known gum formers, conjugated diolefins and styrenes, but this process did not succeed in eliminating the stated disadvantages appreciably and the $C_9+$ fraction remained in the category of a heavy fuel oil.

An object of this invention, therefore, is to provide an improved catalytic hydrogenation process for upgrading dripolene to the point where not only the $C_5$ to $C_8$ fraction is useful in high octane gasoline blending, but where a high proportion of the $C_9+$ fraction is useful as well by essentially eliminating the heretofore mentioned disadvantages, wherein the catalyst is as described above.

As noted, the metals which can be used in the catalyst composition are palladium or platinum.

The amount of palladium dispersed on the surface of the support is about 0.01 percent to about 1.0 percent by weight of the metal based on the weight of the catalyst composition and is preferably about 0.05 percent to about 0.5 percent. The amount of platinum dispersed on the surface of the support is about 0.02 percent to about 2.0 percent by weight of the metal base on the weight of the catalyst composition and is preferably about 0.1 percent to about 1 percent. A sufficient amount of metal is used in the process to give this result. It is found that a weight ratio in the range of about 10,000 parts of support per part of metal to about 100 parts of support per part of metal is satisfactory. A preferred ratio is in the range of about 2000:1 to about 200:1 (support:metal).

The alpha-alumina support is conventional in its chemical composition and crystalline structure; however, its physical characteristics lie within the following parameters. The porosity of the support is about 0.1 cubic centimeter per gram to about 0.8 cubic centimeter per gram of support and, preferably, about 0.2 cubic centimeter per gram to about 0.6 cubic centimeter per gram; the surface area is about 0.1 square meter per gram to about 10 square meters per gram of alpha-alumina support and, preferably, about 0.3 square meter per gram to about 4 square meters per gram; and the average pore size of the pores in the support is about 0.05 micron to about 100 microns, a major proportion of the pores having a size in the range of about 0.05 micron to about 10 microns, the preferred average pore size being about 0.1 micron to about 20 microns with a major proportion of the pores having a size in the range of about 0.1 micron to about 5 microns.

The foregoing parameters are found to be those receptive to achieving the high active site level described here.

While alpha-alumina is the inert support of choice because of its strength and the ease by which it can be formed into desirable shapes, there are other art recognized supports which can be considered its equivalent and can be used herein provided the support meets the above defined parameters. Examples of such supports are magnesia, silica, e.g., fused quartz, silicon carbide, and chromia. It should be noted that all of the mentioned supports are non-adsorbing.

The catalyst composition is made up of discreet particles of alpha-alumina on the surface of which the metal is dispersed. The particles of support which are used in fixed bed processes are, for example, fused agglomerations of very fine alpha-alumina. The supports can have any geometrical shape, e.g., pellets, spheres, or cylinders formed by extrusion or otherwise. Typical particle sizes for fixed bed use, in diameter, range for 1/16 of an inch to ½ inch and are, preferably, in the range of about ⅛ of an inch to ¼ of an inch; overly large particles and ultrafine particles are impractical because it is too difficult to achieve the requisite characteristics for use in fixed-bed reactors. The initial shape of the support used in the process is retained throughout the process. For slurry reactions, micron range size powders, where the requisite parameters can be achieved, can be used as supports, and in other applications, monoliths, such as, alumina mesh, are utilized. In all cases, however, the defined parameters must be adhered to.

As noted above, the catalyst composition consists essentially of the metal and the inert alpha-alumina support. The only acceptable impurities are those which are inert to the process for preparing the catalyst and to the processes in which the catalyst is to be used. It is preferred that no more than 0.1 percent by weight of the total catalyst composition is represented by unacceptable impurities and even more preferable, of course, would be the presence of such impurities in amounts of no more than about 0.05 percent by weight. Examples of unacceptable impurities are halogen, sulfur, and nitrogen. Of course, high purities are conventional in the catalyst art and the various procedures used to limit or avoid impurities are well known, e.g., the use of high purity supports and high purity organo-metallic compounds or inorganic nitrates in the processes for making the catalyst; the use of non-contaminating reaction vessels and other equipment which comes in contact with the catalyst composition during the processes; sweeping the atmosphere with clean gases at various intervals; and, in the case of the nitrates, providing a process which will not leave a nitrogen residue on the support. In practice and in the examples, all components are selected on the basis of the highest degree of purity available commercially consonant with desirable economics.

The number of metal atoms exposed on the surface of the support is measured in percent based on the total number of metal atoms dispersed on the surface of the support. As noted, the number of exposed metal atoms is at least about 7.5 percent of the total metal atoms on the support. This lower limit of 7.5 percent represents a 50 percent or greater improvement over known prior art catalyst compositions, which improvement is achieved with the initial use of a minimal amount of metal. The amount of metal used is particularly significant from a commercial point of view because the reaction rate of the processes in which the catalyst compositions are used can be maximized without increasing the investment in metal. Increased reaction rate, of course, means increased throughput and efficiency. The upper limit achieved here is about 15 percent metal atoms exposed based on the number of metal atoms present on the surface of the support of the catalyst composition. One of the preferred processes for making the catalyst of this invention comprises the following steps:

a. impregnating said alpha-alumina support with a solution of palladium acetylacetonate or platinum acetylacetonate wherein the metal acetylacetonate is present in the solution in an amount sufficient to provide the amount of palladium or platinum, respectively, set forth above, and the solvent is an inert organic solvent having a boiling point below the temperature used in step (b);

b. heating the impregnated support in an inert atmosphere essentially free of oxygen to a temperature in the range of about 140° C. to about 165° C. for a period of time sufficient to remove substantially completely all of the solvent and the constituents of the acetylacetonate moiety; and c. oxidizing said support.

The process is carried out by impregnating the defined alpha-alumina support with a solution of palladium acetylacetonate or platinum acetylacetonate. It is understood that substituted palladium acetylacetonates or substituted platinum acetylacetonates can be used provided that the substituents are inert to the materials used in the process under the process conditions and that the constituents of the substituents can be removed under such process conditions.

The solvent is an organic compound commonly used therefor. It can be either a conventional hydrocarbon solvent or a substituted hydrocarbon solvent, aliphatic, cycloaliphatic, or aromatic. It is a liquid at process temperatures so that its boiling point ranges from just above room temperature, about 20° C. or 25° C, to less than about 165° C. as qualified below and it is preferably non-polar or of low polarity. The function of the solvent is merely to act as an impregnating vehicle. Examples of useful solvents are benzene, toluene, ethylbenzene, biphenyl, the xylenes, n-octane, isooctane, cyclopentane, cyclohexane, methylcyclohexene, tetrahydrofuran, diglyme, ethyl ether, and acetonitrile. The important considerations for the selected solvent are that it be inert to the materials used in the process under process conditions; that it is capable of dissolving a sufficient amount of organo-metallic salt to provide the metal required for the catalyst composition; and that it have a boiling point less than the temperature selected for the heating step (step (b) above), the heating step being in the range of about 140° C. to about 165° C. Generally, about 10 parts by weight of solvent to about 10,000 parts by weight of solvent per part by weight of organometallic salt is satisfactory, and, preferably, about 10 parts to 500 parts of solvent per part of salt.

The support is preferably heated prior to impregnation to a temperature in the range of about 60° C. to about 80° C. in the absence of oxygen. The purpose of this step is to assist in keeping the organometallic salt in solution during impregnation.

The same vessel used for preheating can be used and is preferably used for impregnation to avoid contamination. The vessel used can be a simple heat resistant glass flask, a stainless steel vessel, or a glass-lined stainless steel vessel.

The organometallic salt is then dissolved in the solvent at a temperature in the range of about 60° C. to about 90° C. the heat, of course, increasing the solubility.

The solution is added to the support preferably with agitation such as stirring to assist impregnation. The temperature is maintained at about 60° C. to 90° C. to keep up the level of solubility. Impregnation can also be effected by dipping at the same temperatures, but the need for agitation is avoided thereby.

After impregnation, the impregnated support may be dried under vacuum at about 50° C. to about 90° C. thus removing at least some of the solvent.

The main heating step is conducted in an inert atmosphere essentially free of oxygen. The inert atmospheres used are conventional, e.g., nitrogen, argon, or krypton. The vessel in which this heating step takes place can be similar to those described above or it can be an open ceramic vessel, which is placed in an oven previously purged with the inert gas.

The impregnated support is heated to a temperature in the range of about 140° C. to about 165° C. for a period of time sufficient to remove substantially completely all of the solvent and the constituents of the acetylacetonate moiety. The period of time needed is determined by using known analytical techniques to ascertain whether the solvent or constituents remain on the support. Periods of time ranging from about ten minutes to ten hours are useful and those of at least 20 minutes are preferred. This heating step can be accomplished by using one or two heating steps below the required range, about 60° C. to 110° C., and, then, effecting a final step in the required range for at least about 10 minutes.

A rough determination as to decomposition and removal of the acetylacetonate constituents may be made by visual observation, the organometallic compound giving a yellow color to the support and the metal residue giving a light grey to dark grey color to the support.

After the main heating step, the support is oxidized at temperatures of about 300° C. to about 700° C. The oxidation can take place in air, oxygen, or ozone, and is conventional.

After the oxidation step, and depending on the ultimate use of the catalyst composition, it is then reduced in an inert atmosphere in the same temperature range as the oxidation step using hydrogen or other conventional reducing means.

Stainless steel or quartz reactors can be used for the oxidation and reduction steps.

The oxidation and reduction steps, each can be accomplished in about 1 to about 5 hours and preferably about 1.5 to about 3 hours.

Where the catalyst composition is to be used in oxidation reactions, the reducing step is not effected, but where the catalyst composition is to be used in reducing reactions, the reducing step is preferably included in the process; however, the oxygen removed by the reducing step can also be removed in situ, i.e., during the reducing reaction where it will come off at the beginning of the reaction.

A second procedure for producing the aforementioned catalyst comprises the following steps:

a. impregnating said alpha-alumina support with an aqueous palladium nitrate solution or an aqueous platinum nitrate solution wherein the metal nitrate is present in the solution in an amount sufficient to provide the amount of palladium or platinum, respectively, set forth above;

b. drying the impregnated support at a temperature in the range of up to about 100° C. until at least about 98 percent of the water is removed;

c. heating the impregnated support in an inert atmosphere essentially free of oxygen to a temperature in the range of about 185° C. to about 215° C. for a period of time sufficient to remove substantially completely all of the water and constituents of the nitrate moiety; and d. oxidizing said support.

The process is carried out by impregnating the defined alpha-alumina support with a solution of palladium nitrate or platinum nitrate. It is understood that other inorganic moieties can be present in the metal nitrate compounds provided they are inert to all of the components of the process under the process conditions, are non-contaminating, and can be removed under the process conditions. An example of such a compound is $Pd(NH_3)_4(NO_3)_2$.

The solvent used is water and, generally, about 10 parts by weight of solvent to about 10,000 parts by weight of solvent per part by weight of nitrate is satisfactory, and, preferably, about 10 parts to 500 parts of solvent per part of salt. The water is preferably distilled water to reduce contamination to a minimum.

Impregnation of the support can take place at atmospheric pressure or under vacuum either by adding the solution to the support or dipping the support in the solution. Where the solution is added to the support some kind of agitation is advantageous such as stirring as an aid to impregnation. The vessel used can be a simple heat resistant glass flask, a stainless steel vessel, or a glass-lined stainless steel vessel, all of which can be used throughout the process except the first mentioned, which may not be practical where it is desirable to use pressure as in the reduction step discussed below. Heating is generally not used during the impregnation step.

The drying step can be conducted under vacuum or at atmospheric pressure just as the impregnating step. The temperature used is in the range of up to about 100° C. and is sufficient to remove at least about 98% of the water in a desired time span which may be about 5 hours to 20 hours. Where it is desired to use room temperature, drying can be accomplished by a strong air flow, which is not necessary at higher temperatures. The time is selected preferably for slow drying and the temperature is adjusted to accomplish the objective. In sum, impregnation and drying can be accomplished by any conventional techniques provided the conditions set forth in steps (a) and (b), set forth above, are met.

The main heating step (step (c)) is undertaken next. This heating can be achieved in one, and preferably in two, steps, the first and optional step being in the temperature range of about 75° C. to about 175° C. and preferably about 90° C. to about 160° C. The second step, which is required, is carried out at a temperature in the range of about 185° C. to about 215° C. The time for the heating is that sufficient to remove substantially completely all of the remaining water and the constituents of the nitrate moiety, the removal of which can be determined by analysis. The time for the first step can run from about 1 to about 5 hours and for the second step from about 0.5 hours to 3 hours. Time periods are best determined by experience and are most accurately set after analysis for residual water or constituents of the nitrate. Conventional analytical techniques are used here.

The inert atmospheres used are conventional, e.g., nitrogen, argon, or krypton. The vessel in which this heating step takes place can be similar to those described above or it can be an open ceramic vessel, which is placed in an oven previously purged with the inert gas.

After the main heating step, the support is oxidized at temperatures of about 300° C. to about 700° C. The oxidation can take place in air, oxygen, or ozone, and is conventional.

After the oxidation step, and depending on the ultimate use of the catalyst composition, it is then reduced with hydrogen or other conventional reducing means in an inert atmosphere in the same temperature range as the oxidation step.

Stainless steel or quartz reactors can be used for the oxidation and reduction steps.

The oxidation and reduction steps, each can be accomplished in about 1 to about 5 hours, and preferably about 1.5 to about 3 hours. Pressure can be used if desired, preferably about 1 to about 5 atmospheres (gauge) in the reduction step.

Where the catalyst composition is to be used in oxidation reactions, the reducing step is not effected, but where the catalyst composition is to be used in reducing reactions, the reducing step is preferably included in the process; however, the oxygen removed by the reducing step can also be removed in situ, i.e., during the reducing reaction where it will come off at the beginning of the reaction.

The following examples are offered solely for the purpose of illustrating specific embodiments in the performance of the aforementioned invention and, in particular, its utilization in the hydrogenation of dripolene. It is not intended that such examples should act to limit this invention as to matters of scope and matters of equivalency, that is, the substitution of equivalent materials for those which are described herein.

EXAMPLE 1

The support used in this example is alpha-alumina in the form of particles described as 1/8 inch diameter extrudates (an extrudate has a cylindrical shape) having the following characteristics:

i. porosity = 0.3 cubic centimeter per gram;
ii. surface area = 1 square meter per gram;
iii. average pore size = 1.2 micron;
more than 50 percent of pore sizes are between 0.2 micron and 1.5 micron.

The organo-metallic compound used is palladium acetylacetonate, which contains 35 percent by weight palladium.

200 parts of support are placed in a heat resistant glass reaction vessel and the reactor is evacuated to remove the air. The support is then heated from the outside of the reactor to a temperature of 70° C. by using heat lamps.

1.75 parts of palladium acetylacetonate are dissolved in 52 parts of toluene at 70° C. to 80° C., and the hot solution is added to the support in the reactor. The alpha-alumina is stirred during the addition to assist impregnation.

The impregnated support is then transferred from the reactor to an open ceramic vessel suitable for evaporation and placed in a nitrogen purged oven at 160° C. for 30 minutes.

The resulting composition, which appears to be in a dried state, is then oxidized in a quartz tube at 500° C.

with air for 2 hours and, following a nitrogen purge, is reduced in hydrogen at 500° C. for 2 hours.

Analysis shows that the catalyst composition contains 0.27 percent by weight of palladium based on the weight of the catalyst composition, the palladium being dispersed on the surface of the support, and that the acetylacetonate moiety is essentially decomposed.

Analysis further shows that 11.4 percent of the total transition metal atoms dispersed on the support are exposed on the surface of the support. This measurement is made by carbon monoxide chemisorption.

EXAMPLE 2

Example 1 is repeated except that prior to the step at 160° C., the impregnated support is slowly dried, with low vacuum (about 10 inches of mercury) and stirring, at 80° C. The drying time is about one hour.

The percent of palladium atoms exposed is found to be 9.4.

EXAMPLE 3

Example 2 is repeated except that the impregnated support is rapidly dried with high vacuum. The drying time is about 3 seconds. The results are the same.

EXAMPLE 4

Example 2 is repeated except that the impregnated support is rapidly dried under high vacuum at a temperature of about 60° C. for about 2 hours.

The results are the same.

EXAMPLE 5

The same alpha-alumina support is used as in Example 1.

The metal nitrate used is palladium nitrate, which contains 40 percent by weight palladium.

200 parts of support are placed in a heat resistant glass reaction vessel and the reactor is evacuated to remove the air down to about 1 millimeter of mercury. A solution of 1.5 parts of palladium nitrate in 60 parts of distilled water is prepared.

The solution is added to the support in the reaction vessel, which is shaken gently during the addition to assist impregnation.

The reaction vessel is then attached to a rotary vacuum dryer and the support is heated from the outside of the vessel with heat lamps. The temperature on the outside of the vessel measures about 60° C. to 80° C. and the temperature inside the vessel is approximated at 50° C. The pressure is 100 millimeters of mercury. No purge is used during this drying step. About 50 percent by weight of the water is lost in the first 1.5 hours and about 99 percent by weight of the water is lost at the end of 7.5 additional hours.

The dried catalyst composition is then placed in an oven having a nitrogen atmosphere at 150° C. for 3 hours, followed by 200° C. for 2 hours.

The resulting composition, which appears to be in a dried state, is then oxidized in quartz tube at 500° C. with air for 1 hour and, following a nitrogen purge, is reduced in hydrogen at 500° C. for 2 hours.

Analysis shows that the catalyst composition contains 0.3 percent by weight of palladium based on the weight of the catalyst composition, the palladium being dispersed on the surface of the support, and that the nitrate moiety is essentially decomposed.

Analysis further shows that 10.4 percent of the total transition metal atoms dispersed on the support are exposed on the surface of the support. The measurement is made by carbon monoxide chemisorption.

EXAMPLE 6

The same alpha-alumina support and palladium nitrate are used as in Example 5.

200 parts of support are placed in a perforated basket (similar to a colander). A solution of palladium nitrate is prepared by mixing 7.5 parts of palladium nitrate, 280 parts of distilled water, and 35 parts of concentrated nitric acid to prevent the palladium nitrate from decomposing. The concentration of this solution is such that when 60 parts is retained on the support, the final catalyst composition will have 0.29 percent palladium based on the weight of the catalyst composition.

The solution is placed in an open vessel, which will accommodate the perforated basket and the basket is lowered gently into the solution for impregnation. The support is soaked in the palladium nitrate solution for about a half an hour and then the basket is removed and drained of excess solution. It is then placed in an open vessel suitable for evaporation where it is left exposed to air at room temperature for 1 hour. The impregnated support is then placed in a quartz tube and dried at room temperature with a 200 cubic centimeter per minute air flow for about 16 hours. It is then placed in a 95° C. to 98° C. oven with a nitrogen atmosphere for about 3.5 hours and then the oven temperature is raised to 200° C. and the impregnated support is heated for one more hour.

The resulting composition is then oxidized at 500° C. for one hour in a furnace.

Up until this point all steps are conducted at atmospheric pressure.

The catalyst impregnated support is then charged to a reaction vessel and reduced to about 500° C. with hydrogen at one atmosphere for 1.5 hours.

Analysis shows that the catalyst composition contains 0.29 percent by weight of palladium based on the weight of the catalyst composition, the palladium being dispersed on the surface of the support, and that the nitrate moiety is essentially decomposed.

Analysis further shows that 10.4 percent of the total transition metal dispersed on the support are exposed on the surface of the support. As above, the measurement is made by carbon monoxide chemisorption.

EXAMPLE 7

A method to determine the weight percent of transition metal dispersed on the surface of the support is exemplified as follows:

5 milliliters of nitric acid are added to one gram of the catalyst composition which is prepared in Example 3. The mixture is heated to about 80° C., allowed to stand for 15 to 20 minutes without heat, and then decanted into a 100 millimeter volumetric flask leaving the support. The same procedure is repeated twice using additional 5 milliliter portions of nitric acid. The alumina pellets are then washed with distilled water 5 or 6 times and the liquid is decanted and poured into the flask until 100 milliliters of solution are present in the flask. The solution thus prepared is analyzed by atomic absorption spectroscopy to determine the parts per million of palladium in the solution. The parts per million of palladium in the 100 milliliter solution divided by 100 gives the weight percent of palladium dispersed on the surface of the support.

EXAMPLE 8

Auger spectroscopy is used to confirm the high purity of palladium dispersed on the surface of the alpha-alumina support in each of the fresh catalyst compositions which are prepared in Example 1 to 6, inclusive. No elements other than palladium and those in the initial alpha-alumina are found on the surface of the supports. This analysis is sensitive to elements having a concentration of about 1 to about 10 atoms per 1000 surface atoms. The surface atoms are those atoms present in the top 1 to 5 layers of the catalyst composition. The atoms in these layers are either palladium or those atoms in the original alpha-alumina. The top or outermost layer is made up of the exposed surface atoms, which, again, can be palladium or the atoms in the alpha-alumina. It should be noted that surface hydrogen may be present, but does not show up in the Auger Spectroscopy.

EXAMPLE 9

The performance of the catalyst prepared in Example 1 is tested for 192 days using a BTX dripolene as feedstock.

BTX dripolene is a dripolene containing a large quantity of benzene, toluene, and xylene. Dripolenes are described in U.S. Pat. No. 3,751,361.

A conventional laboratory hydrogenator is used similar to the one described also in U.S. Pat. No. 3,751,361. The hydrogenator is operated at a temperature high enough to maintain an effluent diene value of less than or equal to 2.0. The BTX dripolene feed typically has a diene value of 12 to 18 and a bromine number of 40 to 70.

The catalyst is operated at 60° C. and an LHSV of 2 at startup. The temperature rise across the catalyst is nil or very small. However, as the reactor reaches steady state, a $\Delta T$ of 5 to 10° C. is observed, and slowly the catalyst bed temperature is increased to 80° C. For the first 57 days of operation, the catalyst temperature is about 80° C. and the effluent diene values typically are 1.0, only occasionally approaching 2.0. On the 57th day the space velocity is increased to 3.0 and the recycle ratio increased to 3.3. As a result, the catalyst bed temperature drops to about 72° C. and the effluent diene values increase to 7.7. The reactor is stabilized at about 80° C. a space velocity of 3.0 and recycle ratio of 1.3. In the first 110 days of operation the catalyst shows a high sensitivity to temperature, i.e., a variation of 2° to 5° C. in catalyst temperature changes the effluent diene value by 1 to 2. Thus the catalyst exhibits a high energy of activation. After about 110 days of operation, the catalyst temperature is increased in several 5° increments in order to maintain effluent diene value below 2.0. It appears that the catalyst has lost the high sensitivity to temperature that it previously possesses. These results may be explained by the fact that a different batch of dripolene feed is processed after about the 85th day of operation. The analysis of this dripolene shows a very high content of dicyclopentadiene (DCPD), viz, about 9%. The DCPD is formed by the dimerization of cyclopentadiene (CPD). The presence of high DCPD probably has a varying effect on the effluent diene value for several weeks and then levels off. The high DCPD feed can affect the effluent diene value in two ways:

a. contribute a diene value even though it is not a diene by cracking to CPD (a diene) under diene value determination conditions. A 5% DCPD in toluene is experimentally found to give a diene value of 0.8 and a 10% DCPD in toluene gives a diene value of 1.6.

b. selectively adsorb on surface palladium sites thereby reducing the activity of the catalyst.

Thus high DCPD feed can reduce the effectiveness of the palladium catalyst and make the catalyst appear less sensitive to temperature. Under these conditions, however, the catalyst operates satisfactorily at 120° to 125° C. during the last 10 to 15 days of testing.

Based on first order reaction kinetics, an activity function is developed (1). This can be represented by the following equation:

$$A = \frac{0.22\,[(R+1)\,SV]^{0.305}\,e^{1630/T}\ln}{\pi}\gamma \qquad (1)$$

where:

$A$ = activity factor
$R$ = recycle ratio, lb recycle/lb fresh feed
$SV$ = liquid space velocity of fresh feed, ft³ feed/hr/ft³ catalyst
$T$ = average bed temperature, °K
$\gamma$ = ratio of diene value (DV) in reactor inlet to outlet, $$\frac{DV_{in} + (R)\,DV_{out}}{(1+R)\,DV_{out}}$$

$\pi$ = log-mean hydrogen partial pressure, atmospheric
$\ln$ = natural logarithm The activity according to equation (1) is plotted against days of operation. The plot shows that after an initial drop off in activity from a level of about 3 to about 2, the activity remains constant with the activity factor showing wide fluctuations. These fluctuations may be due to a higher sensitivity to temperature than is incorporated in equation 1. Very little fluctuation in activity factor is observed after 110 days of operation, at which time the catalyst exhibits low temperature sensitivity due to the high DCPD-containing dripolene feed.

Addition of hydrogen sulfide (1000 ppm) to the dripolene feed effective kills the catalyst. Addition of thiophene (1000 ppm), on the other hand, only slightly reduces the activity. The poisoning is apparently completely reversible, and the catalyst recovers all of its previous activity once feeding of the poisons is stopped.

The selectivity for diolefin hydrogenation can be defined as the ratio of rate constants for diolefin hydrogenation to that of olefin hydrogenation. Assuming first order kinetics and neglecting recycle, selectivity, S, then becomes:

$$S = \frac{k_D}{k_{01}} = \frac{\ln\frac{DV_{out}}{DV_{in}}}{\ln\frac{(Br_2No.)_{out}}{(Br_2No.)_{in}}} \qquad (2)$$

where:

$k_D$ = rate constant for diolefin hydrogenation
$k_{01}$ = rate constant for olefin hydrogenation
$DV$ = diene value
$Br_2No.$ = bromine number, a measure of olefinic bonds
$\ln$ = natural logarithm However, since conjugated dienes are known to give a $Br_2$ No. equal to one-half the theoretical value, the $Br_2$No. of effluent can become greater than that of the feed if no olefins are hydrogenated. To avoid such complications, the $Br_2$No. of the effluent is reduced by a factor less than unity, say 0.9 (theoretically equal to the fraction of dienes to olefins). The modified expression then becomes:

$$S = \frac{\ln \frac{DV_{out}}{DV_{in}}}{\ln \frac{(Br_2No.)_{out} \times 0.9}{(Br_2No.)_{in}}} \quad (3)$$

Selectivities, using expression (3) are calculated for most of the data. The variation of selectivity with the duration of run (and reaction temperature) is given in the Table. This table shows that the selectivity of the fresh catalyst ranges between 5 and 6. On addition of thiophene, the selectivity falls to 3.9 and bounces back to 5 to 6 after thiophene is removed. On using high DCPD feed the selectivity appears to be 3 to 4 because of DCPD contribution to a higher effluent diene value. However, this 'S' value of about 4 does not change significantly until the end of the 192 day run. There appears to be some trend that the selectivity is returning back to 5 to 6 on raising temperature to 125° C.

TABLE

| Feed Rate/ Recycle Ratio | Days of Operation | Temperature | Average Selectivity(S) | Remarks |
|---|---|---|---|---|
| 2/1 | 1 to 3 | 60 | 5.9 | Low DCPD Feed |
| 2/1.5 | 32 to 43 | 80 | 5.5 | Low DCPD Feed |
| 3/1.3 | 64 to 68 | 80 | 5.4 | — |
| 3/1.3 | 72 to 74 | 80 | 3.9 | 1000 ppm Thiophene |
| 3/1.3 | 75 to 78 | 80 | 5.3 | Thiophene off |
| 3/1.3 | 115 to 123 | 80–85 | 3.8 | High DCPD Feed |
| 3/1.3 | 152 to 158 | 97–100 | 4.0 | High DCPD Feed |
| 3/1.3 | 164 to 167 | 105 | 4.6 | High DCPD Feed |
| 3/1.3 | 177 to 185 | 115 | 4.8 | High DCPD Feed |
| 3/1.3 | 186 to 192 | 126 | 4.9 | High DCPD Feed |

Note: diene values and bromine numbers are determined by standard ASTM procedures.

EXAMPLE 10

A method to determine the percent of transition metal atoms exposed on the surface of a support in the finished catalyst is exemplified as follows;

Carbon monoxide chemisorption at room temperature (25° C.) is measured using a flow apparatus in which a finished catalyst is reduced in hydrogen at 350° C. for about 30 minutes. Surface hydrogen, if any, is then removed by passing helium through the apparatus over the catalyst. The catalyst is cooled to room temperature and then pulses of a predetermined volume of carbon monoxide are passed over the catalyst using a helium carrier.

The volume of carbon monoxide in each pulse which is not chemisorbed on the catalyst is measured on a chromatograph (in which the column has been replaced by an empty tube). The total volume not chemisorbed is then subtracted from the predetermined volume and the remainder is equal to the volume of carbon monoxide chemisorbed on the catalyst. The chemisorbed volume is then converted into mols of carbon monoxide. The number of exposed surface atoms of metal is determined by assuming one molecule of chemisorbed carbon monoxide per exposed surface metal atom. The number of exposed surface atoms thus determined is then divided by the total atoms of metal dispersed on the catalyst and the quotient is multiplied by 100 to give the percent surface atoms of metal exposed.

EXAMPLE 11

Example 1 is repeated except that the 160° C. temperature is changed to 145° C.

The percent of palladium atom exposed is found to be 8.0.

EXAMPLE 12

Example 11 is repeated except that 3/16 inch diameter extrudates are used.

The percent of palladium atoms exposed is found to be 10.0.

EXAMPLE 13

Example 11 is repeated except that the surface area is 3.5 square meters per gram, the average pore size is 0.35 micron and more than 50 percent of the pore sizes are between 0.1 micron and 0.5 micron.

The percent of palladium atoms exposed is found to be 11.2.

EXAMPLE 14

Example 13 is repeated except that the 145° C. temperature is changed so that this heat treatment is accomplished in three steps of 80° C., 110° C., and 150° C., and the reduction is accomplished by gradually increasing the temperature from 100° C. to 300° C. rather than using the 500° C. temperature.

The percent of palladium atoms exposed is found to be 13.7.

EXAMPLE 15

Example 1 is repeated except that impregnation is effected by dipping as described in example 6, and instead of the 160° C. temperature, the heating is accomplished in two steps of 100° C. and 150° C.

The percent of palladium atoms exposed is found to be 8.0.

EXAMPLE 16

Example 15 is repeated except that 1.6 parts of palladium acetylacetonate are used; the catalyst composition has 0.2 percent palladium dispersed on the surface of the support and the two step heating is replaced by single step heating of 150° C.

The percent of palladium exposed is found to be 8.7.

EXAMPLE 17

Example 1 is repeated except that .58 part of palladium acetylacetonate is used; the catalyst composition has 0.1 percent palladium dispersed on the surface of the support; and the 160° C. heating step is replaced by a 150° C. heating step.

The percent of palladium exposed is found to be 14.5.

EXAMPLE 18

Example 1 is repeated except that 2.4 parts of platinum acetylacetonate are used instead of the palladium acetylacetonate (the platinum acetylacetonate contains 50 percent by weight platinum); instead of the 160° C. heating step, two heating steps are used. The first, at 70° C. and 2 hours, is similar to the heating step with rotary vacuum dryer used in Example 5 and the second heating step is the same as the 160° C. step except that the temperature is 150° C. and the time is 7 hours; oxidation is at 550° C.; and the catalyst composition has 0.6 percent by weight platinum dispersed on the surface of the support.

The percent of platinum exposed is found to be 12.7.

EXAMPLE 19

Example 18 is repeated except the alpha-alumina is the same as that described in example 13.

The percent of platinum exposed is found to be 10.8.

What is claimed is:

1. In a process for the hydrogenation of dripolene in which dripolenes are hydrogenated in the presence of a hydrogenation catalyst, the improvement which comprises utilizing as the catalyst a composition consisting essentially of palladium or platinum metal dispersed on the surface of an alpha-alumina support, said support having the following characteristics:
    a. a porosity of about 0.1 cubic centimeter to about 0.8 cubic centimeter per gram of support;
    b. a surface area of about 0.1 square meter of about 10 square meters per gram of support; and
    c. an average pore size of about 0.05 micron to about 100 microns, a major proportion of the pores having a pore size in the range of about 0.05 micron to about 10 microns
    wherein the amount of palladium dispersed on the surface of the support is about 0.01 percent to about 1.0 percent by weight of metal based on the weight of the catalyst composition, and the amount of platinum dispersed on the surface of the support is about 0.02 percent to about 2.0 percent by weight of metal based on the weight of the catalyst composition; and
    wherein at least about 7.5 percent of the total metal atoms dispersed on the surface of the support are exposed.

2. The process of claim 1 wherein the catalyst composition as defined contains palladium.

3. The process of claim 1 wherein the catalyst as defined contains platinum.

4. The process of claim 2 wherein the catalyst composition as defined has an amount of metal dispersed of about 0.05 percent to about 0.5 percent.

5. The process as defined in claim 3 wherein the amount of metal dispersed is about 0.1 percent to about 1 percent.

6. The process as defined in claim 2 wherein up to about 15 percent of the metal atoms are exposed.

7. The process as defined in claim 3 wherein up to about 15 percent of the metal atoms are exposed.

8. The process as defined in claim 4 wherein with respect to the catalyst support:
    a. the porosity is about 0.2 cubic centimeter per gram to about 0.6 cubic centimeter per gram;
    b. the surface area is about 0.3 square meter per gram to about 4 square meters per gram; and
    c. the average pore size is about 0.1 micron to about 20 microns with a major proportion of the pores having a size in the range of about 0.1 micron to about 5 microns.

9. The process of claim 5 wherein the characteristics of the catalyst support are defined as follows:
    a. the porosity is about 0.2 cubic centimeter per gram to about 0.6 cubic centimeter per gram;
    b. the surface area is about 0.3 square meter per gram to about 4 square meters per gram; and
    c. the average pore size is about 0.1 micron to about 20 microns with a major proportion of the pores having a size in the range of about 0.1 micron to about 5 microns.

10. The process of claim 8 wherein up to about 15 percent of the metal atoms are exposed.

11. The process of claim 9 in which up to about 15 percent of the metal atoms are exposed.

* * * * *

UNITED STATES PATENT OFFICE
CERTIFICATE OF CORRECTION

Patent No. 4,038,175  Dated July 26, 1977

Inventor(s) Madan Mohan Bhasin

It is certified that error appears in the above-identified patent and that said Letters Patent are hereby corrected as shown below:

Column 1, line 5, for "application" read -- applications --; line 13, for "process" read -- processes --; line 34, for "tendencey" read -- tendency --; line 37, for "that" read -- than --. Column 2, line 50, for "is" read -- in --; line 51, after "over" read -- a --; line 68, for "bicyclonoadiene" read -- bicyclononadiene --. Column 3, line 1, for "dicylopentadiene" read -- dicyclopentadiene --; line 2, for "dimethyldidcyclopentadiene" read -- dimethyldicyclopentadiene --. Column 8, line 46, after "gram;" read -- and --. Column 10, line 37, after "reduced", for "to" read -- at --. Column 12, line 45, for "effective" read -- effectively --. Column 15, line 22, after "meter", for "of" read -- to --.

Signed and Sealed this

First Day of November 1977

[SEAL]

Attest:

RUTH C. MASON  
*Attesting Officer*

LUTRELLE F. PARKER  
*Acting Commissioner of Patents and Trademarks*